United States Patent [19]
Woods

[11] 3,748,497
[45] July 24, 1973

[54] TRANSFER GATE

[75] Inventor: David H. Woods, Monroeville, Pa.

[73] Assignee: Westinghouse Electric Corporation, Pittsburgh, Pa.

[22] Filed: Sept. 3, 1971

[21] Appl. No.: 177,565

[52] U.S. Cl. .................................. 307/255, 307/318
[51] Int. Cl. ............................................ H03k 17/00
[58] Field of Search ..................... 307/255, 313, 318

[56] References Cited

UNITED STATES PATENTS 3,130,326 4/1964 Habisohn ............................ 307/255

OTHER PUBLICATIONS

IBM Tech. Disc. Bulletin "Reset Circuit" A Mello Vol. 10, No. 5, 10/67, pge. 666.

*Primary Examiner*—John W. Huckert
*Assistant Examiner*—B. P. Davis
*Attorney*—F. H. Henson, Jack M. Arnold et al.

[57] ABSTRACT

A pair of AND gates have opposite polarity signals applied to their respective signal inputs and the same polarity control pulse applied to their respective control inputs, at a given time. Control means are included for controlling the polarity of the control pulse which is supplied to the respective control inputs of the AND gates. In response to the control pulse being of one value, the first AND gate provides an output signal and the second AND gate provides no output signal. In response to the control pulse being a second value the first AND gate provides no output signal and the second AND gate provides an output signal.

5 Claims, 4 Drawing Figures

TRANSFER GATE

CROSS REFERENCE TO RELATED APPLICATIONS

Reference is made to the following copending patent application and issued patent: "Railway Track Signalling System", Ser. No. 686,468, filed Nov. 29, 1967 and issued Oct. 6, 1970 as U.S. Pat. No. 3,532,877 in the name of George M. Thorne Booth. "Failsafe Logic Gates" filed Dec. 3, 1968, Ser. No. 780,662, on behalf of George M. Thorne Booth. The above-name United States patent and patent application are each assigned to the assignee of the present invention.

BACKGROUND OF THE INVENTION

Recent vehicle control systems are utilizing failsafe electronic logic components to perform the functions that were formerly performed by vital relays as used in vehicle control systems. According to the teachings of the present invention, an electronic signal transfer gate is disclosed which performs the same logic function as performed by a single pole, double throw relay.

SUMMARY OF THE INVENTION

In accordance with the teachings of the present invention a signal transfer gate includes first and second switch means to which a first signal of one value is normally applied for maintaining the first switch means in a closed condition and the second switch means in an open condition. There are also included means responsive to a control signal manifestation for blocking the application of the first signal to said first and second switch means and for applying a second signal of a second value to the first and second switch means for maintaining the first switch means in an open condition and the second switch means in a closed condition.

DESCRIPTION OF THE PREFERRED EMBODIMENT

Figure 1:
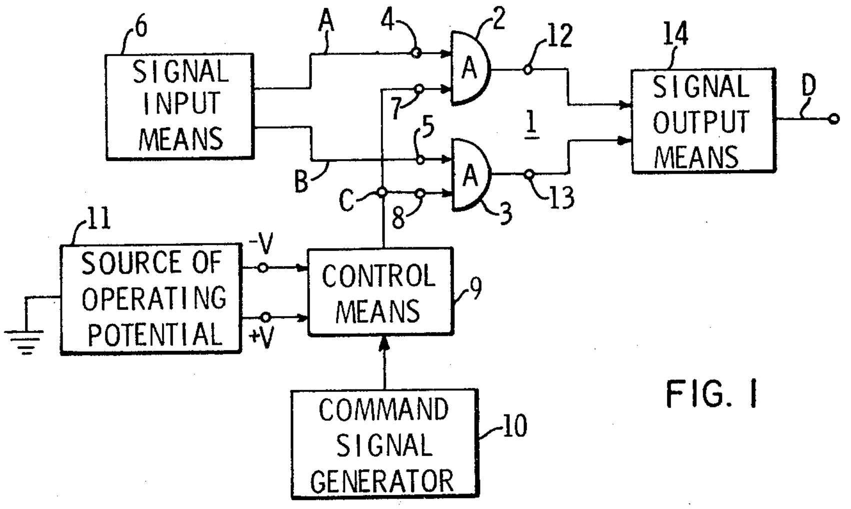
FIG. 1 is a block diagram representation of a signal transfer gate embodying the teachings of the present invention.

In FIG. 1, there is generally illustrated a signal transfer gate 1 which includes first and second AND gates 2 and 3 which have signal input terminals 4 and 5 respectively. A signal input means 6 provides opposite polarity input signals to the signal input terminals of the AND gates 2 and 3. The gates 2 and 3 also include control input terminals 7 and 8, respectively, to which a control signal, having one of two possible values, is applied by way of a control means 9. A command signal generator 10 provides a command signal to the control means 9 for selecting which one of the two possible values of the control signal is applied to the control input terminals of the AND gates 2 and 3 at a given time. A source of operating potential 11 applies voltage levels −V and +V to the control means 9. In the absence of a command signal from the generator 10, the control means 9 provides a control signal at a level of −V to the control input terminals of the AND gates, and in response to a command signal from the generator 10, the control means provides a control signal at a level of +V to the control input terminals of the AND gates. The output terminals 12 and 13 of the AND gates 2 and 3, respectively, are connected to a signal output means 14, which for example, may be used to provide selected vehicle speed codes for a vehicle control system as described in the aforementioned U.S. Pat. No. 3,532,877. The selection of the vehicle speed codes is facilitated by selectively enabling the AND gates 2 and 3.

Figure 4:
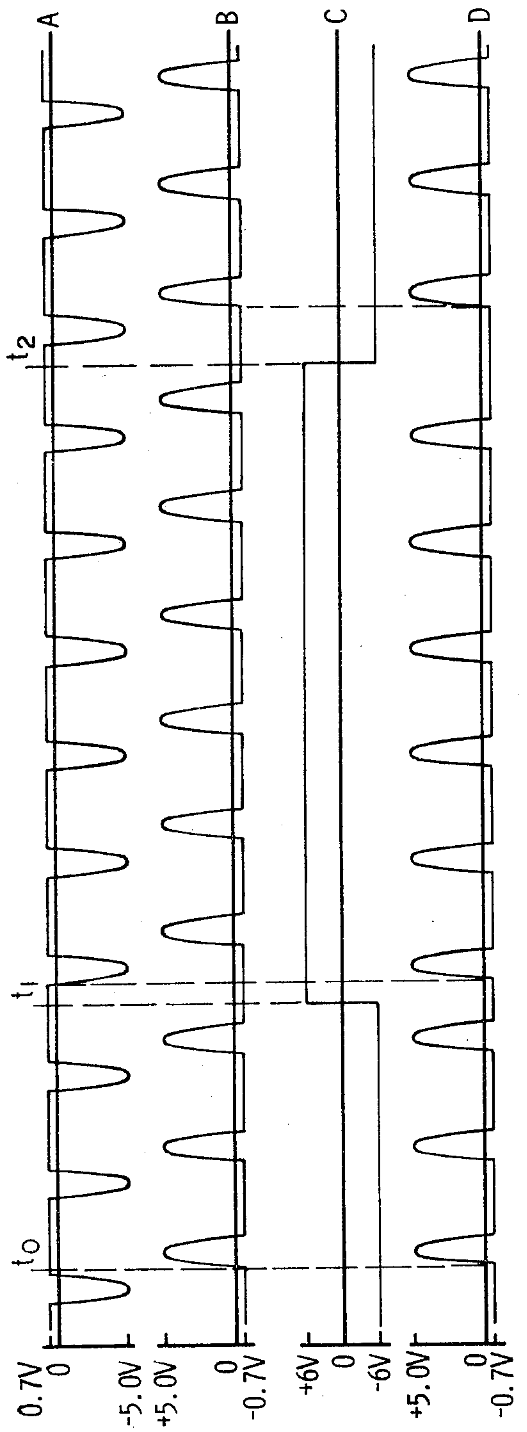
FIG. 4 is a wave shape relationship diagram of certain waveforms present in the circuits of FIGS. 1 and 2.

The letters A through D found on FIG. 1 are the circuit points at which the wave shapes A through D respectively as shown in FIG. 4 are present in the block diagram circuit of FIG. 1. The signal input means 6 provides a negative going coded periodic pulse train which for example may be a vehicle speed command of 80 miles per hour to the input terminal 4 of the AND gate 2 (see wave shape A of FIG. 4). The signal input means 6 also provides an opposite polarity or positive going coded periodic signal to the input terminal 5 of the AND gate 3 (see wave shape B of FIG. 3). This also may be a vehicle speed command for example a speed command of 60 miles per hour. The control means 9 provides a two valued control signal to the control input terminals 7 and 8 of the AND gates 2 and 3 (see wave shape C of FIG. 3). In response to the provided coded input signals and the two valued control pulse, the AND gates selectively apply coded output signals to the input of the signal output means 14. The signal output means 14 in turn provides a coded periodic signal at its output. This latter coded periodic signal may be used to control the speed of a vehicle operative in a vehicle control system as described in the aforementioned U.S. Pat. No. 3,532,877, (See wave shape D of FIG. 4). At a time to, the control signal from the control means 9 is at a first value of −6 volts (see wave shape C of FIG. 4). This negative voltage level enables the AND gate 3 and disables the AND gate 2, therefore the coded positive periodic signal provided to the input terminal 5 of the AND gate 3 is essentially reproduced at the output terminal 13 of the AND gate 3 and the signal output means 14 in response thereto provides a positive going coded periodic signal at its output terminal (see wave shape D of FIG. 4). At a time t1 the command signal generator 10 provides a command signal manifestation to the control means 9 and in response thereto the control means 9 provides a control signal of a second value namely +6 volts to the control input terminals of the AND gates 2 and 3 (see wave shape C of FIG. 4). This latter control signal disables the AND gate 3 and enables the AND gate 2. Therefore, the first pulse in the periodic pulse train applied to the input terminal 4 of the AND gate 2 which occurs shortly after the time *t*1 (see wave shape A of FIG. 4), is inverted and produced at the output terminal 12 of the AND gate 2. This latter signal in turn is provided to the signal output means and a positive going pulse is produced at the output thereof in response to the provided input signal (see wave shape D of FIG. 4). At a time t2, the command signal generator 10 no longer provides a command signal to the control means 9 and the control means 9 therefor again provides a control pulse of −6 volts to the control inputs of the AND gates 2 and 3 which latter control level enables the AND gate 3 and disables the AND gate 2 (see wave shape C of FIG. 4). The circuit then operates in the same manner as described for the time to.

Figure 2:
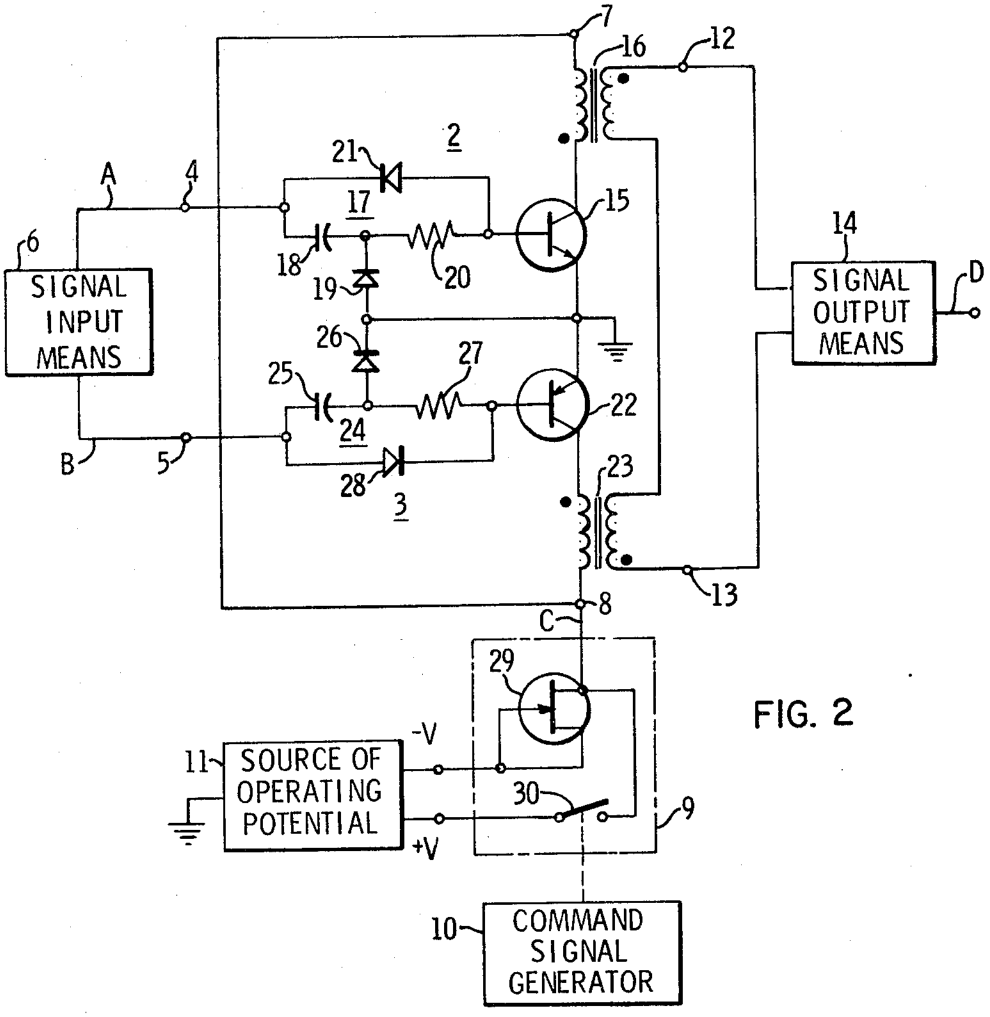
FIG. 2 is a schematic and block diagram representation of a signal transfer gate embodying the teachings of the present invention.

Refer now to FIG. 2 which is a more detailed schematic and block diagram representation of the signal transfer gate 1 which was generally shown in FIG. 1. The letters A through D found on FIG. 2 are the circuit points at which the wave shapes A through D respectively of FIG. 4 are present in the circuit of FIG. 2. The AND gate 2 is comprised of a switch such as the NPN transistor 15 which has its collector electrode connected to one terminal of the primary winding of a transformer 16. The other terminal of the primary winding of the transformer 16 is connected to the control input terminal 7 of the AND gate 2. The emitter electrode of the transistor 15 is connected to a source of reference potential as shown by circuit ground. The base electrode of the transistor 15 is connected to the signal input terminal 4 of the AND gate 2 by way of a signal input network 17 which includes a level shifting network comprised of a charge storage means such as the capacitor 18, a unidirectional current means such as the diode 19 and a resistor 20. A second unidirectional current means such as the diode 21 serves as a signal gating means for negative going signals. The AND gate 3 is comprised of a switch such as the PNP transistor 22 which is opposite conductivity from the transistor 15. The transistor 22 has its collector electrode connected to one terminal of the primary winding of a transformer 23. The remaining terminal of the primary winding of the transformer 23 is connected to the control input terminal 8 of the AND gate 3. The emitter electrode of the transistor 22 is connected to a source of reference potential such as circuit ground. The base electrode of the transistor 22 is connected to the signal input terminal 5 of the AND gate 3 by way of a signal input network 24 which includes a level shifting network which is comprised of a charge storage means such as the capacitor 25, a unidirectional current means such as the diode 26, and a resistor 27. A unidirectional current means such as the diode 28 serves as a signal gating network for positive going signals.

The control means 9 includes a constant current generator such as the field effect transistor 29 which has its gate and source electrode connected in common and in turn to the source of operating potential 11 which supplies a voltage at a level of −V to the common connection of the gate and source electrodes. The drain electrode of the transistor 29 is connected to the control input terminals 7 and 8 of the AND gates 2 and 3 respectively. This latter circuit point is also connected to a first terminal of a switch 30. The remaining terminal of the switch 30 is connected to the source of operating potential 11 and is supplied a voltage at a level of +V. The switch 30 may be one of many switches for example, a transistor switch. Whether the switch 30 is in an open or a closed condition, is determined by the command signal generator 10.

Figure 3:
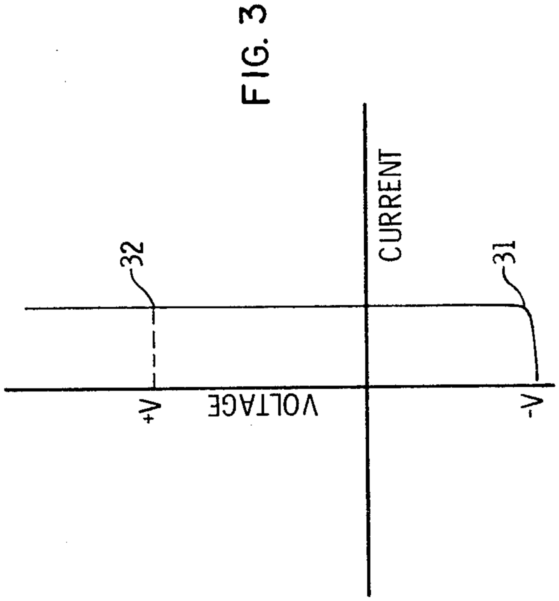
FIG. 3 is a voltage versus current waveform relationship of the operating characteristics of the constant current source illustrated in FIG. 2.

Consider briefly, the operation of the control means 9. When the switch 30 is in an open condition, as shown, the field effect transistor 29 is conducting essentially in a current limited condition and the voltage at a level of −V applied to the common connection of the gate and source electrodes is applied to the control input terminals 7 and 8 of the AND gates 2 and 3, respectively by way of the conduction path of the conducting transistor 29. This latter signal is of a sense to maintain the switch 22 essentially in a closed condition and the switch 15 essentially in an open position. Refer briefly to FIG. 3 which illustrates a voltage versus current characteristic for the field effect transistor 29. When the voltage applied to the gate and source electrodes of the transistor 29 is at a level of −V the transistor 29 essentially becomes current limited, which is shown at the point 31 in FIG. 3. When the switch 30 is closed in response to a command signal from the generator 10 a voltage level of +V is applied to the drain electrode of the transistor 29 by way of the closed switch 30. The transistor 29 remains in a current limited condition however, the drain electrode of the transistor rapidly rises to a level of +V as shown at the point 32 on the curve of FIG. 3. This latter voltage level is applied to the control input terminals 7 and 8 of the AND gates 2 and 3 respectively and is of a sense to maintain the switch 22 essentially in an open condition and the switch 15 essentially in a closed condition.

Consider now the general operation of the signal transfer gate of FIG. 2. At a time to, the control signal provided by the control means 9 is at a negative voltage level namely −6 volts (see wave shape C of FIG. 4). This control signal is applied to the control input terminals 7 and 8 of the AND gates 2 and 3 respectively. The AND gate 3 therefore is in an enabled condition and the AND gate 2 is in a disabled condition. Accordingly, the transistor switch 22 is essentially closed and the transistor switch 15 is essentially open. Since the transistor switch 15 is in an open condition, it is not responsive to any periodic signals provided to the input terminals 4 of the AND gate 2. The AND gate 3 is at this time receiving positive going periodic signals at its input terminal 5 (see wave shape B of FIG. 4). The negative portions of the input signal applied to the input termimal 5 are level shifted by the network 24 and provided to the base electrode of the transistor 22 making the transistor 22 conductive. The positive going portions or pulses of the inpout signal are passed by the conducting diode 28 and in response thereto, the transistor becomes non-conductive. During the times the transistor 22 is non-conductive, the transformer 23 rings and positive going pulses are produced at the non-dot side of the secondary winding of the transformer 23 and coupled by way of the secondary winding of the transformer 16 to the signal output means 14 which in turn provides a periodic positive going signal at its output as illustrated at the wave shape D of FIG. 4. The ringing action and operation of the AND gate 3 is described in detail in the aforementioned patent application Ser. No. 780,662. At a time t1, the command signal generator 10 provides a command or control signal manifestation to the control means 9 closing the switch 30 and a control signal at a second value namely +V is applied to the control input terminals 7 and 8 of the AND gates 2 and 3 respectively. This latter signal disables the AND gate 22 and enables the AND gate 2. Accordingly, the transistor 15 is essentially maintained in a closed condition and the transistor switch 22 is essentially maintained in an open condition. Since the transistor switch 22 is in an open condition, it is nonresponsive to any periodic input pulses applied to the input terminal 5. Since however, the transistor switch 15 is in a closed condition, it is responsive to the negative going periodic signals applied to its input terminal 4, (see wave shape A of FIG. 4). The positive going portions of this latter periodic signal are level shifted by the signal input network 17 and applied to the base electrode of the transistor switch 15 making the transistor 15 conductive. The diode 21 passes the negative going portions or pulses of this input signal causing the transistor 15 to become non-conductive. During the non-conductive periods that is, when the input signal is at a negative voltage level, the transformer 16 rings and positive pulses are provided at the dot side of the secondary winding of the transformer 16 and applied to the signal output means 14. The ringing action and operation of the AND gate 2 is described in detail in the aforementioned patent application Ser. No. 780,662. A positive going periodic signal is then produced in response thereto at the output of the signal output means 14. This latter output signal may be a speed command for a vehicle operational in a vehicle control system as described in aforementioned U.S. Pat. No. 3,532,877. At a time t2, the command signal generator 10 no longer provides a command signal to the control means 9 and the switch 30 therefore returns to the original open condition and the transistor 29 provides a control signal at a level of –V to the control input terminals 7 and 8 of the AND gates 2 and 3 respectively. The AND gate 2 therefore is in a disabled condition and the AND gate 3 is in an enabled condition. The circuit then operates in a manner as previously described for the time to.

In summary, a signal transfer gate has been described which includes first and second AND gates each having a signal input, a control input and an output. The AND gates receive opposite polarity signals at their respective signal inputs and a common control signal at their respective control inputs. In response to the control signal being of one value, the first AND gate is enabled and the second AND gate is disabled. In response to the control signal being of a second value, the first AND gate is disabled and the second AND gate is enabled.

I claim as my invention:

1. In a signal transfer gate, the combination comprising:

first and second transistors of opposite conductivity each having base, emitter, and collector electrodes;

first and second transformers with one terminal of the primary winding of the first transformer connected to one terminal of the primary winding of the second transformer, and the other terminal of the primary winding of the first transformer connected to the emitter electrode of said first transistor, and the other terminal of the primary winding of the second transformer connected to the collector electrode of the second transistor;

first and second signal input network means connected to the base electrodes of said first and second transistors, respectively, for applying provided first and second input signals to the respective base electrodes;

output circuit means connected to the secondary windings of said first and second transformers; and means for selectively applying operating potential of one of two values to the common primary winding connection of said transformers, the first value being of the sense to render said first transistor conductive and said second transistor non-conductive, and the second value being of the sense to render said first transistor non-conductive and said second transistor conductive.

2. The combination claimed in claim 1 wherein said first and second input signals are of opposite polarity.

3. The combination claimed in claim 2 wherein said first and second signal input network means are signal level shifting means.

4. The combination claimed in claim 3 wherein said means for selectively applying operating potential of one of two values to the common connection of said transformers comprises:

a field effect transistor having gate, source, and drain electrodes, with one of said source and drain electrodes being connected to the common connection of said transformers, and the remaining one of said source and drain electrodes being connected to said gate electrode;

a source for providing said first and second values of operating potential, the gate electrode of said field effect transistor being connected to said source to receive the first value of operating potential; and switch means connected at one terminal to said source to receive the second value of operating potential, and also being connected at the other terminal to the common connection of said transformers, and including means for selectively closing said switch for applying said second value of operating potential to the common connection of said transformers.

5. In a signal transfer gate, the combination comprising:

first and second transistors of opposite conductivity each having base, emitter, and collector electrodes;

first and second impedance means each having first and second terminals and an output terminal, with the first terminal of the first impedance means being connected to the first terminal of the second impedance means, and the second terminal of the first impedance means being connected to the emitter electrode of said first transistor, and the second terminal of the second impedance means being connected to the collector electrode of said second transistor;

first and second signal input network means connected to the base electrodes of said first and second transistors, respectively, for applying provided first and second input signals to the respective base electrodes;

output circuit means connected to the respective output terminals of said first and second impedance means; and means for selectively operating potential of one of two values to the common connection of said first and second impedance means, the first value being of a sense to render said first transistor conductive and said second transistor non-conductive, and the second value being of a sense to render said first transistor non-conductive and said second transistor conductive.

* * * * *

Disclaimer

3,748,497.—*David H. Woods*, Monroeville, Pa. TRANSFER GATE. Patent dated July 24, 1973. Disclaimer filed Nov. 28, 1973, by the assignee, *Westinghouse Electric Corporation.*

Hereby enters this disclaimer to claims 1–5 of said patent.

[*Official Gazette March 12, 1974.*]